US012668685B2

(12) United States Patent
Gatti et al.

(10) Patent No.: US 12,668,685 B2
(45) Date of Patent: Jun. 30, 2026

(54) PROCESS FOR THE PREPARATION OF STYRENE-BUTADIENE RUBBERS COMPRISING RECYCLED RUBBER POWDER

(71) Applicant: VERSALIS S.P.A., San Donato Milanese (IT)

(72) Inventors: Gabriele Gatti, Ravenna (IT); William Montanari, Ravenna (IT); Costantino Perretta, Ferrara (IT); Giovanni Regattieri, Ravenna (IT)

(73) Assignee: VERSALIS S.P.A., San Donato Milanese (IT)

( * ) Notice: Subject to any disclaimer, the term of this patent is extended or adjusted under 35 U.S.C. 154(b) by 561 days.

(21) Appl. No.: 18/250,454

(22) PCT Filed: Oct. 25, 2021

(86) PCT No.: PCT/IB2021/059819
§ 371 (c)(1),
(2) Date: Apr. 25, 2023

(87) PCT Pub. No.: WO2022/090892
PCT Pub. Date: May 5, 2022

(65) Prior Publication Data
US 2025/0270392 A1      Aug. 28, 2025

(30) Foreign Application Priority Data

Oct. 26, 2020      (IT) ........................ 102020000025285

(51) Int. Cl.
| | |
|---|---|
| *C08J 3/00* | (2006.01) |
| *C08J 3/16* | (2006.01) |
| *C08L 9/08* | (2006.01) |
| *C08L 17/00* | (2006.01) |

(52) U.S. Cl.
CPC ................. *C08L 9/08* (2013.01); *C08J 3/005* (2013.01); *C08J 3/16* (2013.01); *C08L 17/00* (2013.01); *C08J 2309/08* (2013.01); *C08J 2317/00* (2013.01); *C08L 2207/24* (2013.01)

(58) Field of Classification Search
CPC ..... C08L 9/08; C08L 17/00; C08J 3/00; C08J 3/16
USPC ....................................................... 524/526
See application file for complete search history.

(56) References Cited

U.S. PATENT DOCUMENTS

| | | | |
|---|---|---|---|
| 4,070,324 A | 1/1978 | Fronzoni et al. | |
| 5,504,168 A | 4/1996 | Maestri et al. | |
| 5,602,586 A | 2/1997 | Schauer et al. | |
| 6,541,526 B1 | 4/2003 | Goldshtein et al. | |
| 9,527,978 B2 | 12/2016 | Maris | |
| 9,840,613 B1 | 12/2017 | Kulkaski et al. | |
| 2007/0173567 A1* | 7/2007 | Ishino ..................... | C08C 19/08 |
| | | | 524/495 |
| 2016/0208082 A1* | 7/2016 | Jasiunas .................. | C08L 21/00 |

FOREIGN PATENT DOCUMENTS

| | | |
|---|---|---|
| CN | 1252415 A | 5/2000 |
| CN | 101792546 A | 8/2010 |
| CN | 102344591 A | 2/2012 |
| CN | 105713399 A | 6/2016 |
| CN | 108250453 A | 7/2018 |
| CN | 109438785 A | 3/2019 |
| CN | 111171503 A | 5/2020 |
| CN | 111560130 A | 8/2020 |
| EP | 2772513 A1 | 9/2014 |
| JP | S5237950 A | 3/1977 |
| JP | S6243440 A | 2/1987 |
| JP | S62240326 A | 10/1987 |
| JP | H0737950 A | 2/1995 |
| JP | 2000265106 A | 9/2000 |
| JP | 2007291333 A | 11/2007 |
| WO | 2011038578 A1 | 4/2011 |

OTHER PUBLICATIONS

El-Aasser M. S. et al., "Emulsion Polymerization and Emulsion Polymers" (1997), John Wiley and Sons, New York, Chapter II, pp. 37-55, and Chapter VI, pp. 208-234.
International Search Report and Written Opinion for International Application No. PCT/IB2021/059819, dated Jan. 27, 2022, 9 pages.
Chinese Office Action for Application No. 2021800695846, dated Sep. 21, 2024, 11 pages with English translation.
Japanese Office Action for Application No. 2023-524155, dated Jul. 29, 2025, 10 pages with translation.
Taiwanese Office Action for U.S. Appl. No. 11/013,850, dated Jan. 23, 2025, 16 pages with translation.

(Continued)

*Primary Examiner* — Deve V Hall
(74) *Attorney, Agent, or Firm* — CANTOR COLBURN LLP

(57) ABSTRACT

A process for preparing a styrene-butadiene rubber includes micronized recycled rubber powder and includes the following steps:
preparing a suspension having micronized recycled rubber powder, water and at least one surfactant;
mixing the suspension from step (a) with at least one styrene-butadiene latex to obtain a styrene-butadiene latex having micronized recycled rubber powder;
and subjecting the latex from step (b) to coagulation to obtain a coagulated styrene-butadiene rubber having micronized recycled rubber powder. In step (a), the particle size of the micronized recycled rubber powder ranges from 0.05 mm to 0.8 mm;
the at least one surfactant is present in an amount ranging from 0.5% by weight to 3% by weight, with respect to total weight of the micronized recycled rubber powder; and
the micronized recycled rubber powder has a concentration in water ranging from 1% by weight to 50% by weight, with respect to the total weight of the water.

13 Claims, 2 Drawing Sheets

(56)          References Cited

OTHER PUBLICATIONS

Singapore Search Report and Written Opinion for Application No. 11202302967X, dated Oct. 14, 2025, 9 pages.
Chinese Office Action for Application No. 2021800695846, dated Apr. 17, 2025, 21 pages with translation.
Garmonov I.V. (editor). Sinteticheskiy kauchuk (Synthetic Rubber) Khimiya. Leningrad branch, 1976, pp. 255-263.
Russian Office Action for Application No. 2023110039, dated Mar. 18, 2025, 21 pages with translation.
Vizgalova A.Yu, Bachelor's Degree Thesis on "Optimisation of the extraction of SKMS-ZOARK latex, polymerisation of butadiene-1-Z and amethylstyrene", Institute of Chemistry and Engineering Ecology, 2016, 68 pages with machine translation.

* cited by examiner

PROCESS FOR THE PREPARATION OF STYRENE-BUTADIENE RUBBERS COMPRISING RECYCLED RUBBER POWDER

CROSS-REFERENCE TO RELATED APPLICATIONS

This application is a 35 U.S.C. § 371 National Stage patent application of PCT/IB2021/059819 filed 25 Oct. 2021, which claims the benefit of Italian patent application 102020000025285 filed 26 Oct. 2020, the disclosures of which are incorporated herein by reference in their entirety.

TECHNICAL FIELD

The present disclosure relates to a process for the preparation of styrene-butadiene rubbers comprising micronized recycled rubber powder.

More particularly, the present disclosure relates to a process for the preparation of a styrene-butadiene rubber comprising micronized recycled rubber powder, said process comprising the following steps: (a) preparing a suspension comprising micronized recycled rubber powder, water and at least one surfactant; (b) mixing the suspension obtained in step (a) with at least one styrene-butadiene latex to obtain a styrene-butadiene latex comprising micronized recycled rubber powder; (c) subjecting the latex obtained in step (b) to coagulation to obtain a coagulated styrene-butadiene rubber comprising micronized recycled rubber powder.

The styrene-butadiene rubber comprising micronized recycled rubber powder obtained from the aforesaid process, as it is, or in a mixture with other rubbers such as, for example, natural rubber (NR), polybutadiene (BR), styrene-butadiene copolymers, or mixtures thereof, may be advantageously used in vulcanizable elastomeric compositions, which in turn may be used in various sectors such as, for example, tyres, shoe soles, brakes, conveyor belts.

BACKGROUND

Rubber recycling is a continuously developing sector that is attracting ever greater interest, thanks to the growing attention to issues such as, for example, environmental sustainability and the circular economy. As a result, scientific articles and patents on said recycling are very numerous.

One of the most widely used methods for the purpose of recycling rubber is to reduce it into fine powders and add it to virgin rubbers through dry mechanical mixing.

For example, U.S. Pat. No. 9,840,613 relates to a polymer formulation that is useful as a structural material for manufacturing a wide variety of articles, said polymer formulation being composed of: (1) from about 45% by weight to about 85% by weight of a micronized rubber powder, (2) from about 15% by weight to about 45% by weight of a metallocene polyolefin elastomer and (3) from about 1% by weight to about 10% by weight of a polyethylene grafted with maleic anhydride. The components of the aforesaid polymer formulation are dried and mixed in a twin-screw extruder.

It is also known to recycle rubber by means of the technology known as devulcanization which aims at breaking the sulfur bridges to bring the polymer as close as possible to its original shape.

For example, U.S. Pat. No. 5,602,586 relates to a process for devulcanizing a vulcanized rubber by desulphurisation, comprising the steps of: contacting the crumb of vulcanized rubber with a solvent and an alkali metal so as to obtain a reaction mixture; heating the reaction mixture, under stirring, in the absence of oxygen, to a temperature sufficient to make the alkali metal react with the sulfur present in the vulcanized rubber; and, keeping the temperature below the temperature at which thermal cracking of the rubber occurs, obtaining devulcanization.

Further details of the devulcanization technology may be found, for example, in U.S. Pat. Nos. 6,541,526 and 9,527,978.

Rubber recycling processes including the use of rubbers in emulsion or solution are also known.

For example, Chinese patent application CN 101792546 relates to a process for the preparation of a composition composed of rubber powder and rubber, comprising the following steps of: mixing rubber powder, said rubber powder optionally containing powder additives or a sizing agent containing water or materials containing a softening oil, with a rubber in emulsion or in solution, or with a wet rubber in solid form not previously dried, to obtain intermediate products consisting of a rubber-rubber powder composition and, subsequently, carrying out a liquid removal treatment to obtain products consisting of a rubber-rubber powder composition in a solid state.

Chinese patent application CN 102344591 relates to a process for the preparation of a composition comprising rubber characterised by comprising the following steps: (1) mixing, in a closed mixer, a recycled rubber powder of graded or mixed grain size from 90 mesh (approximately 0.16 mm) to 200 mesh (0,074 mm), said recycled rubber optionally containing powdered additives, or additives containing water or/and a softening oil, with a rubber in emulsion or in solution so as to obtain a homogeneous material; or mixing, in a kneader, said recycled rubber powder with a wet rubber in solid form which has not previously been dried, so as to obtain a homogeneous material; (2) subjecting the homogeneous material obtained in step (1) to a dehydration treatment by, for example, de-emulsification, centrifugation, pelletisation, hot air fluidization, flue gas baking, vaporization in a steam cylinder, hot extrusion, traditional liquid removal techniques, obtaining a homogeneous composition comprising rubber-rubber powder.

However, the above processes may have some drawbacks, such as for example:

- worsening of the physical-mechanical properties of the elastomeric compositions wherein they are used;
- problems related to handling as well as to the health of the operators;
- technical problems related to fouling of the production lines and the equipment used.

Micronized recycled rubber powder is known to be highly hydroscopic. The absorption of the moisture by the micronized recycled rubber powder can worsen both the mechanical mixing ("dry mixing") with the virgin rubber and the subsequent vulcanization process, causing a worsening in the physical and mechanical properties of the final vulcanized product.

Furthermore, the use of micronized recycled rubber powder in mechanical mixing ("dry mixing") requires careful management in terms of both environmental sustainability and operator health, in order to avoid risks such as for example explosions or dispersion of micro-particles into the atmosphere, with a consequent increase in process costs. In addition, the use of micronized recycled rubber powder in mechanical mixing ("dry mixing") may be a major problem for inadequately equipped facilities.

Finally, the use of micronized recycled rubber powder can cause fouling of the production lines and equipment used, which can result in clogging and malfunctioning, increasing both time and process costs.

SUMMARY

The Applicant therefore posed the problem of finding a process for the preparation of a styrene-butadiene rubber comprising micronized recycled rubber powder, capable of overcoming the above problems.

The Applicant has now found a new process for the preparation of a styrene-butadiene rubber comprising micronized recycled rubber powder, which thanks to the use of a suspension comprising micronized recycled rubber powder having a specific size, water and at least one surfactant, said surfactant being present in specific amounts, enables the aforesaid drawbacks to be overcome. Said process makes it possible to obtain a styrene-butadiene rubber comprising micronized recycled rubber powder that may be advantageously used, as it is, or in a mixture with other rubbers such as, for example, natural rubber (NR), polybutadiene (BR), styrene-butadiene copolymers, or mixtures thereof, in vulcanizable elastomeric compositions, which in turn may be used in various sectors such as, for example, tyres, shoe soles, brakes and conveyor belts.

The present disclosure provides a process for the preparation of a styrene-butadiene rubber comprising micronized recycled rubber powder, said process comprising the following steps:

(a) preparing a suspension comprising micronized recycled rubber powder, water and at least one surfactant;

(b) mixing the suspension obtained in step (a) with at least one styrene-butadiene latex to obtain a styrene-butadiene latex comprising micronized recycled rubber powder;

(c) subjecting the latex obtained in step (b) to coagulation to obtain a coagulated styrene-butadiene rubber comprising micronized recycled rubber powder;

wherein:

in step (a) the particle size of said micronized recycled rubber powder is ranging from 0.05 mm to 0.8 mm, preferably ranging from 0.1 mm to 0.4 mm;

in step (a) said at least one surfactant is present in an amount ranging from 0.5% by weight to 3% by weight, preferably ranging from 1% by weight to 2.5% by weight, with respect to total weight of said micronized recycled rubber powder;

in step (a) said micronized recycled rubber powder has a concentration in water ranging from 1% by weight to 50% by weight, preferably ranging from 5% by weight to 30% by weight, with respect to the total weight of said water.

For the purpose of the present description and the following claims, the definitions of the numerical intervals always comprise the extreme values unless otherwise specified.

For the purpose of the present description and the following claims, the term "comprising" also includes the terms "which essentially consists of" or "which consists of".

For the purpose of the present description and the following claims, the particle size of said micronized recycled rubber powder has been determined in accordance with the standard ASTM D5644-18.

For the purpose of the process the present disclosure provides that the micronized recycled rubber powder may come from different types of rubber products such as, for example, whole end-of-life tyres (ELT) or parts of tyres (for example, treads). The micronized recycled rubber powder can therefore include different types of rubber such as, for example natural rubber (NR), styrene butadiene rubber (SBR), butadiene rubber (BR), as well as fillers such as, for example, carbon black, silica, sulfur and accelerators, additives of various kinds.

The micronized recycled rubber powder may be obtained by processes known in the art. For example, the micronized recycled rubber powder may be obtained through a cryogenic process, a mechanical milling process, or a high-pressure process, in the presence of water. In all processes, the steel components are removed by means of a magnetic separator and the fibre components are separated by air classifiers or other separation equipment. In the cryogenic process, the ground rubber is frozen at an extremely low temperature and then crushed into small particles. The mechanical grinding process, generally carried out at room temperature (25° C.), uses various grinding equipment such as for example, cracker mills, granulators, and the like, in order to mechanically break the rubber into small particles. The high-pressure procedure, in the presence of water, comprises subjecting the rubber product, for example, an end-of-life tyre, to a high-pressure water jet that scratches the outermost parts of the tyre, generating small particles.

For the purpose of the present disclosure, a micronized recycled rubber powder obtained by any one of the processes known in the art may be used: for example, by means of any of the above processes.

Examples of micronized recycled rubber powders which may be advantageously used for the purpose of the present disclosure and which are currently commercially available are the products known by the trade names of PolyDyne™ ($d_{90}$ ranging from 0.074 mm to 0.4 mm) from Lehigh Technologies, rubber powder B.0/0.35 ($d_{90}$<0.35 mm) from Albatros, TyreXol™ CWN 0-400 ($d_{90}$<0.33 mm) from Tyre Recicling Solutions.

In accordance with a preferred embodiment of the present disclosure, in step (a) said at least one surfactant may be selected, for example, from: non-ionic surfactants such as, for example, polyoxyethylene derivatives of fatty acids, alkyl-polyglucosides, ethanolamides, ethoxylated amides, ethoxylated amines, ethoxylated acids, polyoxyethylene alkyl-ethers, or mixtures thereof.

In accordance with a further preferred embodiment of the present disclosure, in step (a) said at least one surfactant may be selected, for example, from anionic surfactants such as, for example: salts formed by carbon atom long chains terminated with a carboxylate or sulfonate group [for example, sodium lauryl sulfate (SLS), sodium lauryl ethoxy sulfate (SLES)], alkyl-benzene-sulphonic acids (ABS), polysulfonated aromatic ethers (for example, Dowfax™ 2A1 by Dow Chemical), or mixtures thereof; sodium, potassium, lithium or ammonium salts, preferably sodium or potassium, of fatty acids, saturated or unsaturated, containing from 6 to 22 carbon atoms in the molecule such as, for example caproic acid, lauric acid, myristic acid, palmitic acid, stearic acid, oleic acid, linoleic acid, linolenic acid, or mixtures thereof, or mixtures of said salts; sodium, potassium, lithium or ammonium salts, preferably sodium or potassium, of modified resin acids which are obtained by dimerization, disproportionation, hydrogenation, modification of resin acid mixtures containing abietic acid, neoabietic acid, palustric acid, levopimaric acid, or mixtures thereof, or mixtures of said salts [for example, potassium salt derived from disproportionation of the resin acid Potassium Soap 80% Gresinox 578 M from Parchem].

In accordance with a further preferred embodiment of the present disclosure, in step (a) said at least one surfactant may be selected, for example, from cationic surfactants such as, for example long-chain quaternary ammonium salts [for example, benzalkonium chloride (BAC), cetyl-trimethylammonium bromide (CTAB), hexadecyltrimethylammonium bromide], or mixtures thereof.

In accordance with a further preferred embodiment of the present disclosure, in step (a) said at least one surfactant may be selected, for example, from amphoteric surfactants such as, for example, coco-amidopropyl-betaine, dodecyl-betaine, lecithin, aminocarboxylic acids, or mixtures thereof.

In accordance with a preferred embodiment of the present disclosure, said step (a) may be carried out at a temperature ranging from 20° C. to 90° C., preferably ranging from 50° C. to 80° C., for a variable time depending on the size of the mixer and sufficient to obtain a homogeneous suspension, preferably for a time ranging from 2 minutes to 60 minutes, preferably ranging from 4 minutes to 40 minutes.

Said step (a) may be carried out by mixing micronized recycled rubber powder, water and at least one surfactant in a mixer provided with a stirring system suitable for obtaining a homogeneous suspension, i.e. a suspension wherein the micronized recycled rubber powder is homogeneously distributed throughout the entire volume of water and surfactant. Preferably, said stirring system may consist of a mixed secondary flow impeller such as, for example, a 45° "Pitch Blade" type impeller, or of a purely axial flow "hydrofoil" type impeller such as, for example, Lightnin's A310 3-blade propeller.

It should be noted that, by operating as described above, a stable homogeneous ("turbid") suspension is obtained at the end of step (a). For the purpose of this description, the term "stable homogeneous suspension" means that such suspension does not show visible stratification, phase separation, or settling for at least 5 minutes, in the absence of stirring, at room temperature (25° C.).

For the purpose of the process the present disclosure provides that the styrene-butadiene latex used may be obtained by processes known in the art, for example by emulsion radical copolymerization as reported, for example, in U.S. Pat. Nos. 4,070,324 and 5,504,168, or in El-Aasser M. S. and Sudol D., "*Emulsion Polymerization and Emulsion Polymers*" (1997), Klein A. and Daniel E. S. Ed., John Wiley and Sons, New York, Chapter VI, pages 37-55.

In accordance with a preferred embodiment of the present disclosure, in said step (b) said at least one styrene-butadiene latex may have an amount of styrene-butadiene polymer ranging from 10% by weight to 50% by weight, preferably ranging from 15% by weight to 30% by weight, with respect to the total weight of said latex and an amount of linked styrene ranging from 10% by weight to 60% by weight, preferably ranging from 20% by weight to 50% by weight, with respect to the total weight of said latex.

In accordance with a preferred embodiment of the present disclosure, in said step (b) the suspension obtained in step (a) may be added in such an amount to have an amount of micronized recycled rubber powder ranging from 5% by weight to 95% by weight, preferably ranging from 8% by weight to 35% by weight, with respect to the total weight of the styrene-butadiene rubber contained in the latex.

Said step (b) may be carried out in a mixer (called "pre-mixer") provided with a stirring system suitable to obtain a styrene-butadiene latex comprising micronized recycled rubber powder, wherein said micronized recycled rubber powder is homogeneously distributed in the latex. Preferably, said stirring system may consist of a mixed secondary flow impeller such as, for example, a 45° "Pitch Blade" type impeller, or of a purely axial flow "hydrofoil" type impeller such as, for example, Lightnin's A310 3-blade propeller.

In accordance with an embodiment of the present disclosure, said step (b) may be carried out in a mixer (called pre-mixer), at a temperature ranging from 20° C. to 90° C., preferably ranging from 50° C. to 80° C., for a variable time depending on the size of the mixer and sufficient to obtain a styrene-butadiene latex comprising micronized recycled rubber powder, wherein said powder is homogeneously distributed in the latex, preferably for a period of time ranging from 1 minute to 45 minutes, preferably ranging from 5 minutes to 15 minutes.

In said mixer (called pre-mixer), further components generally used in emulsion radical copolymerization processes for the production of styrene-butadiene rubbers (e-SBR) may be added, such as, for example, surfactants selected from those reported above, extender oils, antioxidants: more details regarding said emulsion radical copolymerization processes for the production of styrene-butadiene rubbers (e-SBR) may be found, for example, in U.S. Pat. Nos. 4,070,324 and 5,504,168, or in El-Aasser M. S. and Sudol D. in "*Emulsion Polymerization and Emulsion Polymers*" (1997), Lovell P. A and El-Aasser Ed., John Wiley and Sons, New York, Chapter VI, pages 208-234, reported above.

Alternatively, said step (b) may be carried out in the same coagulation mixer (called "coagulation tank") wherein said step (c) (coagulation) is carried out: in this case, the mixing between the suspension obtained in step (a) and the styrene-butadiene latex takes place directly in said coagulation mixer (called "coagulation tank") [step (c1)].

The present disclosure further provides a process comprising the following steps:

(a1) preparing a suspension comprising micronized recycled rubber powder, water and at least one surfactant;

(c1) mixing the suspension obtained in step (a) with at least one styrene-butadiene latex and subjecting the whole to coagulation to obtain a coagulated styrene-butadiene rubber comprising micronized recycled rubber powder;

wherein:

in step (a1) the particle size of said micronized recycled rubber powder is ranging from 0.05 mm to 0.8 mm, preferably ranging from 0.1 mm to 0.4 mm;

in step (a1) said at least one surfactant is present in an amount ranging from 0.5% by weight to 3% by weight, preferably ranging from 1% by weight to 2.5% by weight, with respect to total weight of said micronized recycled rubber powder;

in step (a1) said micronized recycled rubber powder has a concentration in water ranging from 1% by weight to 50% by weight, preferably ranging from 5% by weight to 30% by weight, with respect to the total weight of said water.

It is to be noted that, in the case wherein said step (b) is carried out in the same coagulation mixer (called "coagulation tank") wherein said step (c) (coagulation) is carried out, i.e., [step (c1)], in the mixer (called "pre-mixer"), the mixing between the further components reported above and the styrene-butadiene latex may be still carried out in order to obtain a styrene-butadiene latex wherein said further components are homogeneously distributed in the latex, by operating under the same conditions described above for step (b).

Said step (a1) is carried out operating under the same conditions as described above for step (a).

In accordance with a preferred embodiment of the present disclosure, in said step (c1) said at least one styrene-butadiene latex may have an amount of styrene-butadiene polymer ranging from 10% by weight to 50% by weight, preferably ranging from 15% by weight to 30% by weight, with respect to the total weight of said latex and an amount of linked styrene ranging from 10% by weight to 60% by weight, preferably ranging from 20% by weight to 50% by weight, with respect to the total weight of said latex.

In accordance with a preferred embodiment of the present disclosure, in said step (c1) the suspension obtained in step (a1) may be added in such an amount to have an amount of micronized recycled rubber powder ranging from 5% by weight to 95% by weight, preferably ranging from 8% by weight to 35% by weight, with respect to the total weight of the styrene-butadiene rubber contained in the latex.

In accordance with a preferred embodiment of the present disclosure, said step (c) and step (c1) may be carried out in the presence of at least one coagulation agent which may be selected, for example, from alkylamine-epichloridine copolymers (for example, dimethylamine-epichlorhydrin copolymer known by the trade name Floquat® FL 2250 from NSF).

The amount of coagulation agent and of the other components that may be present, such as for example surfactants, extender oils, antioxidants, varies depending on the latex and the amount of micronized recycled rubber powder used.

In accordance with a preferred embodiment of the present disclosure, said step (c) and step (c1) may be carried out at a temperature ranging from 40° C. to 90° C., preferably ranging from 60° C. to 80° C., for a variable time depending on the size of the coagulation mixer (called "coagulation tank"), the amounts of suspension obtained in step (a) or in step (a1) and the styrene-butadiene latex used, the temperature and the pH, the used stirring system, preferably for a time ranging from 5 minutes to 120 minutes, preferably ranging from 10 minutes to 60 minutes.

In accordance with a preferred embodiment of the present disclosure, said step (c) and step (c1) may be carried out at a pH lower than or equal to 5, preferably ranging from 2.5 to 4.

In accordance with a preferred embodiment of the present disclosure, at least one inorganic acid such as, for example, sulfuric acid, phosphoric acid, preferably sulfuric acid, may be added to said step (c) and step (c1).

In accordance with a preferred embodiment of the present disclosure, said at least one organic acid may be added in such an amount to maintain the pH lower than or equal to 5, preferably ranging from 2.5 to 4, for the entire duration of said step (c) and step (c1).

Said step (c) and step (c1) may be carried out in a coagulation mixer (called "coagulation tank") provided with a stirring system. It should be noted that said stirring system is also suitable to allow a homogeneous distribution of the micronized recycled rubber powder in the styrene-butadiene latex, if said step (b) is carried out in the same coagulation mixer (called "coagulation tank") as said step (c) [step (c1)]. Preferably, said stirring system may consist of a mixed secondary flow impeller such as, for example, a 45° "Pitch Blade" type impeller, or a purely axial flow "hydrofoil" type impeller such as, for example, Lightnin's A310 3-blade propeller.

After coagulation, the styrene-butadiene rubber comprising micronized recycled rubber powder is generally present in the form of crumbs.

Preferably, said crumbs are neutralised by adding an aqueous solution containing at least one organic base such as, for example, a sodium carbonate solution and then washing with water. The water used for said washing may be both deionised water and non-deionised water.

Preferably, said washing with water may be carried out at a temperature ranging from 35° C. to 90° C., preferably ranging from 40° C. to 90° C.

The styrene-butadiene rubber comprising micronized recycled rubber powder may be subjected to one or more washings with water, for example, from one to seven washes, which may be carried out in batch or continuously, preferably continuously. Partial drying of the styrene-butadiene rubber comprising micronized recycled rubber powder may also be carried out between washes.

After washing with water, the styrene-butadiene rubber comprising micronized recycled rubber powder is generally subjected to water removal ("dewatering"). Water removal may be carried out in two steps, by subjecting the styrene-butadiene rubber comprising micronized recycled rubber powder first to mechanical treatment, for example, by means of screw devices and then to evaporation for example, by means of stove, hot plate; or in a single step by subjecting the styrene-butadiene rubber comprising micronized recycled rubber powder directly to evaporation, for example, by means of stove, hot plate. Said water removal ("dewatering") may be carried out at a temperature ranging from 40° C. to 150° C., preferably ranging from 60° C. to 120° C., for a time longer than 5 minutes, preferably ranging from 8 minutes to 45 minutes: the time, however, must be sufficient to obtain a styrene-butadiene rubber comprising micronized recycled rubber powder having a residual moisture content of less than 1% by weight of the total weight of the styrene-butadiene rubber.

In accordance with a preferred embodiment of the present disclosure, said process may be carried out both in "batch" and continuously, preferably continuously.

As mentioned above the styrene-butadiene rubber comprising micronized recycled rubber powder obtained from the aforesaid process, as it is, or in a mixture with other rubbers such as, for example, natural rubber (NR), polybutadiene (BR), styrene-butadiene copolymers, or mixtures thereof, may be advantageously used in vulcanizable elastomeric compositions, which in turn may be used in various sectors such as, for example, tyres, shoe soles, brakes, conveyor belts.

For example, said styrene-butadiene rubber comprising micronized recycled rubber powder may be used, in a mixture with carbon black and/or silica, in vulcanizable elastomeric compositions suitable for the preparation of tyres.

Therefore, the present disclosure further provides a vulcanizable elastomeric composition comprising at least one styrene-butadiene rubber comprising micronized recycled rubber powder obtained as described above, at least one filler selected from carbon black, silica, or mixtures thereof, and at least one vulcanizing agent. Preferably, said filler may be present in said vulcanizable elastomeric composition in an amount ranging from 5 phr to 500 phr.

Said vulcanizable elastomeric composition may comprise, in addition to said styrene-butadiene rubber comprising micronized recycled rubber powder, other elastomers such as, for example, natural rubber (NR), polybutadiene (BR), or mixtures thereof.

For the purpose of the present disclosure and the following claims, the term "phr" means parts by weight of a given component per 100 parts by weight of styrene-butadiene rubber comprising micronized recycled rubber powder present and other elastomers optionally present in the vulcanizable elastomeric composition.

Said vulcanizing agent may be selected, for example, from soluble or insoluble elemental sulfur, or from sulfur donors, or mixtures thereof.

Sulfur donors are, for example, dimorpholyl disulphide (DTDM), 2-morpholino-dithiobenzothiazole (MBSS), caprolactam disulphide, dipentamethylenethiurame tetrasulphide (DPTT), tetramethylthiurame disulphide (TMTD), or mixtures thereof.

If the vulcanizing agent is selected from sulfur or sulfur donors, it may also be advantageous to use other additives (e.g., accelerators) such as, for example, dithiocarbamates, thiurams, thiazoles, sulphenamides, xanthogenates, guanidine derivatives, caprolactams, thiourea derivatives, or mixtures thereof, in order to increase the vulcanization yield.

In said vulcanizable elastomeric composition, said sulfur, and/or said sulfur donors, and said other above-mentioned additives optionally present, are generally present in an amount ranging from 0.05 phr to 10 phr, preferably ranging from 0.1 phr to 8 phr.

Other components may be added to the vulcanizable elastomeric compositions of the present disclosure.

For example, inorganic or organic compounds may be added. Examples of said compounds are: zinc oxide; zinc carbonate; lead oxide; saturated or unsaturated organic fatty acids or zinc salts thereof; polyalcohols; amino alcohols (e.g., triethanolamine); amines (e.g., dibutylamine, dicyclohexylamine, cyclohexylethylamine); polyether amines; or mixtures thereof.

Vulcanization inhibitors such as for example N-cyclohexyl-thiophthalimide (PVI), N,N'-dinitrosopentamethylene-tetramine (DNPT), phthalic anhydride (PTA), diphenylnitrosamine, or mixtures thereof may also be added.

In addition to the aforesaid vulcanizing agents and/or other compounds, the vulcanizable elastomeric composition of the present disclosure may comprise other further additives customarily used in the elastomeric compositions and known to those skilled in the art such as, for example, other fillers, filler activators, ozone protection agents, ageing inhibitors, antioxidants, processing aids, extender oils, plasticisers, reinforcing materials, mould releasing agents.

Other fillers which may be used for the purpose of the present disclosure are, for example: barium sulfate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon® (preferably in powder form), silicates, or mixtures thereof. The total amount of fillers is however ranging from 5 phr to 500 phr.

Filler activators which may be used for the purpose of the present disclosure are, for example: organic silanes such as, for example, bis(triethoxysilylpropyl)polysulphide, vinyltrimethylsilane, vinyl-dimethoxymethylsilane, vinyltriethoxysilane, vinyltris-(2-methoxyethoxy)silane, N-cyclohexyl- 3-aminopropyl-trimethoxysilane, 3-amino-propyltrimethoxysilane methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane, (octadecyl) methyl-dimethoxysilane, or mixtures thereof. Additional filler activators are, for example, surfactants such as triethanolamine, ethylene glycols, or mixtures thereof. The amount of filler activators is generally ranging from 0 phr to 10 phr.

The present disclosure also provides a vulcanized product obtained from the vulcanization of said vulcanizable elastomeric compositions.

BRIEF DESCRIPTION OF THE DRAWINGS

The present disclosure will now be illustrated in greater detail through an embodiment with reference to FIGS. 1 and 2 reported below.

Figure 1:
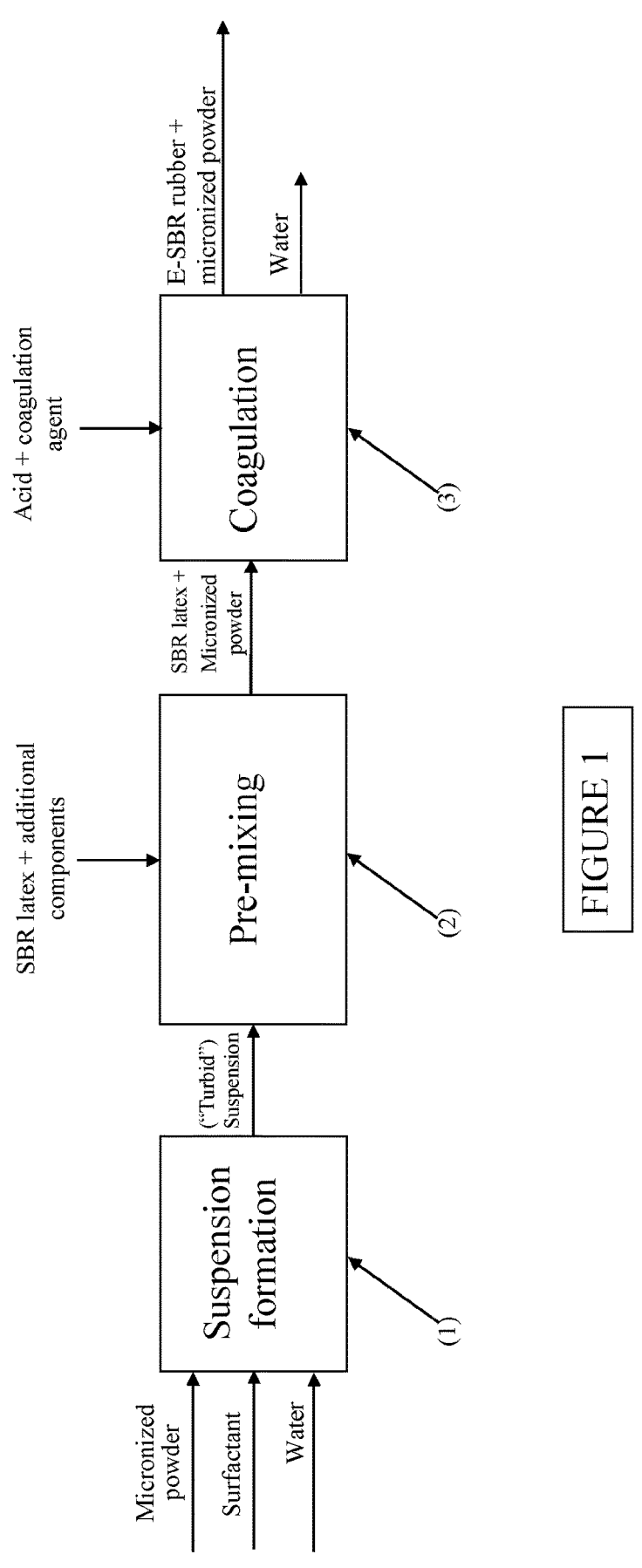
FIG. 1 schematically illustrates a first embodiment of the process of the present disclosure. For this purpose, the micronized recycled rubber powder (micronized powder), water and at least one surfactant (for example, Potassium Soap 80% Gresinox 578 M) are fed to a first mixer (1) equipped with a stirring system (e.g. a 45° "Pitch Blade" type impeller or a 3-blade propeller A310 from Lightnin), obtaining a suspension ("turbid") [step (a)]. The suspension ("turbid") obtained in step (a) is fed to a second mixer (2) ("called pre-mixer") equipped with a stirring system (for example, a 45° "Pitch Blade" type impeller, or a 3-blade propeller A310 from Lightnin), wherein the styrene-butadiene latex (SBR latex) and any other components [for example, surfactants, extender oils, antioxidants (other components)] are also fed, obtaining a styrene-butadiene latex comprising micronized recycled rubber powder [(step (b)] (SBR latex+micronized powder). The obtained latex is fed to a third mixer (i.e., a coagulation mixer called "coagulation tank") (3) equipped with a stirring system (for example, a 45° "Pitch Blade" type impeller or a 3-blade propeller A310 from Lightnin) to which an acid (for example, sulfuric acid) and a coagulation agent (for example, Floquat FL 2250) are also fed, and subjected to coagulation [step (c)], pH neutralisation (for example, with an aqueous solution of sodium carbonate), washing with water and removal of water ("dewatering") obtaining a styrene-butadiene rubber comprising micronized recycled rubber powder (eSBR rubber+micronized powder).
Figure 2:
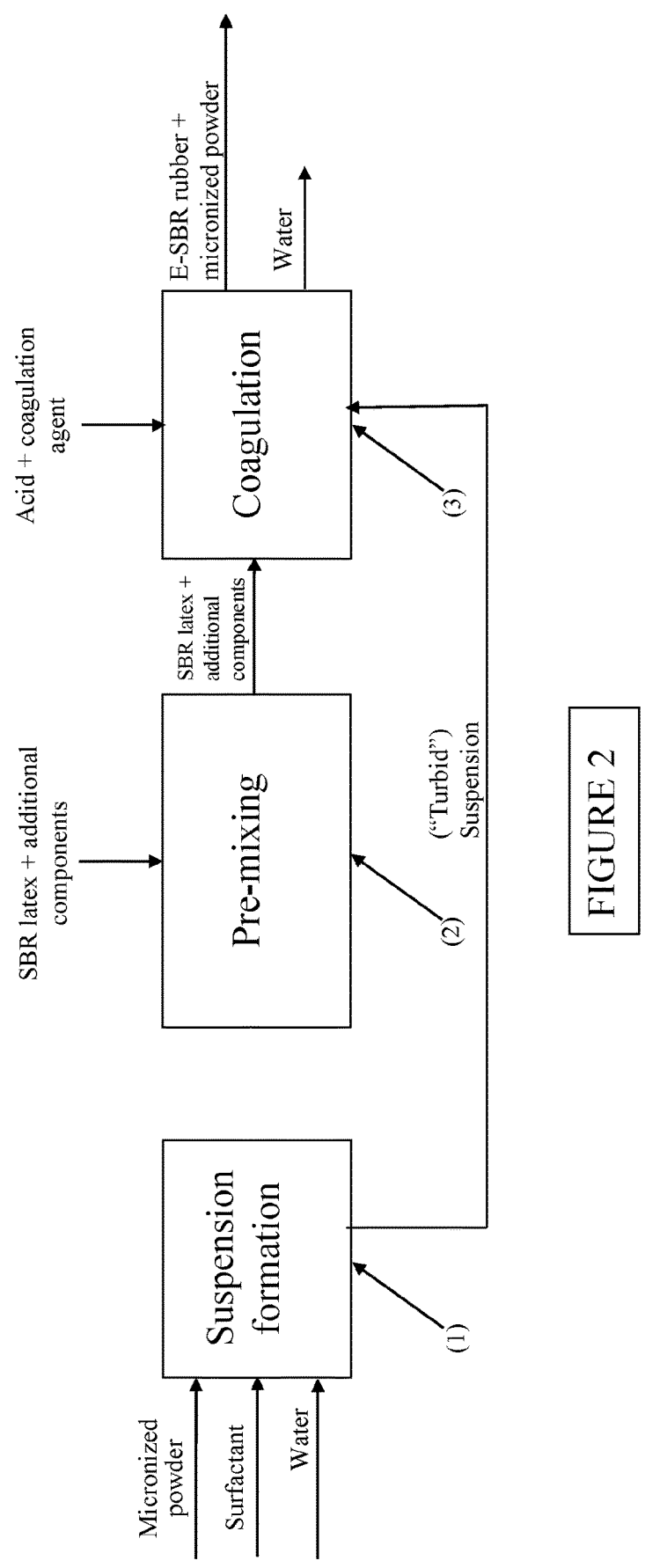
FIG. 2 schematically illustrates a second embodiment of the process of the present disclosure. For this purpose, the micronized recycled rubber powder (micronized powder), water and at least one surfactant (for example, Potassium Soap 80% Gresinox 578 M) are fed to a first mixer (1) equipped with a stirring system (for example, a 45° "Pitch Blade" type impeller or a 3-blade propeller A310 from Lightnin), obtaining a suspension ("turbid") [step (a1)]. To a second mixer (2) (called "pre-mixer") equipped with a stirring system (for example, a 45° "Pitch Blade" type impeller, or a 3-blade propeller A310 from Lightnin), the styrene-butadiene latex (SBR latex) and any other components [(for example, surfactants, extender oils, antioxidants (further components)] are fed, obtaining a styrene-butadiene latex comprising said other components (SBR+further components). The obtained latex is fed to a third mixer (i.e. a third mixer (i.e., a coagulation mixer known as a "coagulation tank") (3) equipped with a stirring system (for example, a 45° "Pitch Blade" type impeller or a 3-blade propeller A310 from Lightnin) to which the suspension ("turbid")

obtained in step (a1), an acid (for example, sulfuric acid) and a coagulation agent (for example, Floquat FL 2250) are also fed, and the whole is subjected to coagulation [step (c1)], pH neutralisation (for example, with an aqueous solution of sodium carbonate), washing with water and removal of water ("dewatering") obtaining a styrene-butadiene rubber comprising micronized recycled rubber powder (eSBR rubber+micronized powder).

DETAILED DESCRIPTION OF THE DISCLOSURE

In order to better understand the present disclosure and to put it into practice, some illustrative and non-limiting examples thereof are reported below.

Example 1

In a first 20-litre mixer, equipped with a stirring system consisting of a 45° "Pitch Blade" type impeller, 67.5 g of micronized recycled rubber powder deriving from end-of-life tyres (ELT) [rubber powder B.0/0.35 ($d_{90}$<0.35 mm)-Albatros], 675 ml of water and 13.5 g of a 10% by weight aqueous solution of anionic surfactant (Potassium Soap 80% Gresinox 578 M-Parchem) are loaded: the whole was kept, under stirring, at 310 rpm, for 5 minutes, at 60° C., obtaining 765 g of a suspension ("turbid").

The suspension ("turbid") was sent to a second 20-litre mixer (called "pre-mixer") equipped with a stirring system consisting of a 45° "Pitch Blade" type impeller, wherein 3.2 litres of styrene-butadiene latex (styrene-butadiene polymer amount equal to 21% by weight and styrene amount equal to 40% by weight, with respect to the total weight of said latex), 2.7 g of antioxidant (Irganox® 1520L-Basf), 252 g of aromatic oil [RAE ("Residual Aromatic Extract")-Clematis RL-Eni) and 25 g of a 10% by weight aqueous solution of anionic surfactant (Potassium Soap 80% Gresinox 578 M-Parchem) were loaded: the whole was kept, under stirring, at 310 rpm, for 10 minutes, at 60° C., obtaining 4.25 litres of styrene-butadiene latex comprising micronized recycled rubber powder.

In a third 70-litre mixer (i.e. coagulation mixer called "coagulation tank") equipped with a stirring system consisting of a 45° "Pitch Blade" type impeller, 10 litres of deionised water were loaded, and, after bringing the temperature to 70° C., sulfuric acid (Aldrich) was gradually fed until a pH value equal to 3 was reached: subsequently, 4.25 litres of styrene-butadiene latex comprising micronized recycled rubber powder obtained as reported above at a flow rate equal to about 0.7 litres/minute and 13.4 grams of coagulation agent (Floquat FL 2250-SNF) were loaded. At the end, the whole was kept, under stirring, at 100 rpm, for a further 30 minutes, at a temperature of 70° C. and at pH equal to 3: during coagulation it is necessary to add again sulfuric acid (Aldrich) in order to maintain the pH equal to 3. Subsequently, still under stirring, at 100 rpm, after having brought the temperature to 80° C., sodium carbonate (Aldrich) was added in order to bring the pH to a value equal to 6.5-7: once the desired pH was reached, the coagulated latex was filtered in order to recover the styrene-butadiene rubber crumbs comprising micronized recycled rubber powder, which were then washed under a flow of deionised water, at a temperature of about 70° C., for 10 minutes.

After 10 minutes, the styrene-butadiene rubber crumbs comprising micronized recycled rubber powder were dried in an air oven at 100° C., for 24 hours (residual moisture: lower than 1%).

Example 2

Example 2 was carried out operating under the same operating conditions as Example 1 using different amounts of components: Table 1 shows the amounts of the various components for the production of styrene-butadiene rubber comprising micronized recycled rubber powder.

TABLE 1

| COMPONENTS | AMOUNT | |
|---|---|---|
| SUSPENSION PREPARATION ("TURBID") (FIRST MIXER) | | |
| Water | 1.35 | litres |
| Potassium Soap 80% Gresinox 578 M (aqueous solution at 10% by weight) | 27 | grams |
| ELT rubber powder B.0/0.35 ($d_{90}$ < 0.35 mm) | 135 | grams |
| SECOND MIXER ("PRE-MIXER") | | |
| Styrene-butadiene latex | 3.2 | litres |
| RAE ("Residual Aromatic Extract") - Clematis RL | 252 | grams |
| Irganox ® 1520 L | 2.7 | grams |
| Potassium Soap 80% Gresinox 578 M (aqueous solution at 10% by weight) | 25 | grams |
| Suspension ("Turbid") | 1512 | grams |
| THIRD MIXER ("COAGULATION TANK") | | |
| Water | 10 | litres |
| Latex from pre-mixer | 4.99 | litres |
| Floquat FL 2250 | 13.4 | g |
| Sulfuric acid | q.s.* | |
| Sodium carbonate | q.s.* | |

*as much as is sufficient.

Example 3

Example 3 was carried out operating under the same operating conditions as Example 1 using different amounts of components and a different aromatic oil [TDAE ("Treated Distillated Aromatic Extract")-Norman 346-ORGKHIM]: Table 2 shows the amounts of the various components for the production of styrene-butadiene rubber comprising micronized recycled rubber powder.

TABLE 2

| COMPONENTS | AMOUNT | |
|---|---|---|
| SUSPENSION PREPARATION("TURBID") (FIRST MIXER) | | |
| Water | 1.35 | litres |
| Potassium Soap 80% Gresinox 578 M (aqueous solution at 10% by weight) | 27 | grams |
| ELT rubber powder B.0/0.35 ($d_{90}$ < 0.35 mm) | 135 | grams |
| SECOND MIXER ("PRE-MIXER") | | |
| SBR latex | 3.2 | litres |
| TDAE ("Treated Distillated Aromatic Extract") - Norman 346 | 252 | grams |
| Irganox ® 1520 L | 2.7 | grams |
| Potassium Soap 80% Gresinox 578 M (aqueous solution at 10% by weight) | 25 | grams |
| Suspension ("Turbid") | 1512 | grams |

TABLE 2-continued

| COMPONENTS | AMOUNT |
|---|---|
| THIRD MIXER ("COAGULATION TANK") | |
| Water | 10 litres |
| Latex from pre-mixer | 4.99 litres |
| Floquat FL 2250 | 13.4 g |
| Sulfuric acid | q.s.* |
| Sodium carbonate | q.s.* |

*as much as is sufficient.

Example 4

Example 4 was carried out operating under the same operating conditions as in Example 1 using different amounts of components, a different styrene-butadiene latex (styrene-butadiene polymer amount equal to 21% by weight and styrene amount equal to 23.5% by weight, with respect to the total weight of said latex) and without aromatic oil: Table 3 shows the amounts of the various components for the production of styrene-butadiene rubber comprising micronized recycled rubber powder.

TABLE 3

| COMPONENTS | AMOUNT |
|---|---|
| SUSPENSION PREPARATION ("TURBID") (FIRST MIXER) | |
| Water | 1.35 litres |
| Potassium Soap 80% Gresinox 578 M (aqueous solution at 10% by weight) | 27 grams |
| ELT rubber powder B.0/0.35 ($d_{90} < 0.35$ mm) | 135 grams |
| SECOND MIXER ("PRE-MIXER") | |
| SBR latex | 3.2 litres |
| Irganox ® 1520 L | 2.7 grams |
| Potassium Soap 80% Gresinox 578 M (aqueous solution at 10% by weight) | 25 grams |
| Suspension ("Turbid") | 1512 grams |

TABLE 3-continued

| COMPONENTS | AMOUNT |
|---|---|
| THIRD MIXER ("COAGULATION TANK") | |
| Water | 10 litres |
| Latex from pre-mixer | 4.99 litres |
| Floquat FL 2250 | 13.4 g |
| Sulfuric acid | q.s.* |
| Sodium carbonate | q.s.* |

*as much as is sufficient.

Example 5

The styrene-butadiene rubbers comprising micronized recycled rubber powder obtained in Examples 1 and 2 reported above were used to produce compounds for treads.

The compound comprising the styrene-butadiene rubber comprising micronized recycled rubber powder obtained in Example 1 is hereinafter referred to as (A).

The compound comprising the styrene-butadiene rubber comprising micronized recycled rubber powder obtained in Example 2 is hereinafter referred to as (B).

The physical and mechanical properties of the above compounds were compared with those of two other compounds, defined as follows:

(C) compound comprising styrene-butadiene rubber (Europrene® 1739-Versalis) and micronized recycled rubber powder deriving from end-of-life tyres (ELT) [rubber powder B.0/0.35 ($d_{90} < 0.35$ mm)-Albatros] (10 phr) added by dry mixing;

(D) compound comprising styrene-butadiene rubber (Europrene® 1739-Versalis) and micronized recycled rubber powder deriving from end-of-life tyres (ELT) [rubber powder B.0/0.35 ($d_{90} < 0.35$ mm)-Albatros] (20 phr) added by dry mixing.

Preparation of Compounds

The compounds were prepared in a 1.6 litre Banbury type internal mixer: the operating conditions are reported in Table 4, the components and the amounts are given in Table 5.

TABLE 4

| | Time | Operating conditions Banbury 60 rpm; FF*: 0.70; T: 60° C. | |
|---|---|---|---|
| | (min) | Compounds (A) and (B) | Compounds (C) and (D) |
| Banbury feeding | 0 | Styrene-butadiene rubber + ELT (obtained from Example 1 and Example 2) | Europrene ® 1739 |
| | 1 | ½ carbon black + oil + other components reported in TABLE 5 (excluding sulfur, TBBS and TBDT 80) | ½ carbon black + ELT + oil + other components reported in TABLE 5 (excluding sulfur, TBBS and TBDT 80) |
| | 3 | ½ carbon black | ½ carbon black |
| | 6 | discharge ($T_{max}$ 140° C.) | discharge ($T_{max}$ 140° C.) |
| Acceleration | 0 | Discharged compound + sulfur + TBBS and TBDT 80 | Discharged compound + sulfur + TBBS and TBDT 80 |
| | 2 | discharge ($T_{max}$ 105° C.) | discharge ($T_{max}$ 105° C.) |

*FF: Filling Factor.

The samples were then vulcanized at 160° C. according to ISO 6502-1: 2018 Standard.

TABLE 5

| COMPONENTS | Compound A (phr) | Compound B (phr) | Compound C (phr) | Compound D (phr) |
|---|---|---|---|---|
| e-SBR + micronized powder | 147.5 | 157.5 | — | — |
| Europrene ® 1739 | — | — | 137.5 | 137.5 |
| ELT | — | — | 10 | 20 |
| N 220 | 80 | 80 | 80 | 80 |
| Aromatic oil | 10 | 10 | 10 | 10 |
| WB 220 | 2 | 2 | 2 | 2 |
| 6-PPD | 0.8 | 0.8 | 0.8 | 0.8 |
| Stearic acid | 2.0 | 2.0 | 2.0 | 2.0 |
| TMQ | 0.6 | 0.6 | 0.6 | 0.6 |
| ZnO 80 | 3.8 | 3.8 | 3.8 | 3.8 |
| TBBS | 2.0 | 2.0 | 2.0 | 2.0 |
| TBTD 80 | 0.4 | 0.4 | 0.4 | 0.4 |
| Sulfur | 2.3 | 2.3 | 2.3 | 2.3 | e-SBR+micronized powder: styrene-butadiene rubber comprising micronized recycled rubber powder obtained as reported above in Examples 1 and 2;

Europrene® 1739 (e-SBR): oil-extended styrene-butadiene rubber obtained in emulsion (TDAE-oil) (Versalis);

ELT: rubber powder B.0/0.35 ($d_{90}$<0.35 mm)-Albatros;

N220: carbon black;

aromatic oil: TDAE ("Treated Distillated Aromatic Extract")-NORMAN 346-ORGKHIM;

WB 220 (processing aid): Struktol;

Stearic acid: Sigma Aldrich;

TMQ (antioxidant): 2,2,4-trimethyl-1,2-dihydroquinoline, polymerised (Nord Chemie);

Rhenogran® ZnO 80 (activator): zinc oxide (Lanxess);

TBBS (accelerator): N-tert-butyl-2-benzothiazilsulfenamide, Vulkacit® NZ/EGC (Lanxess);

TBTD 80 (accelerator): tetrabutylthiurame disulfide (Sigma Aldrich).

Table 6 shows the physical-mechanical properties of the vulcanized compounds obtained and the corresponding methods of measurement.

TABLE 6

| Definition | Unit of measurement | Standard Method | Compounds (A) | (B) | (C) | (D) |
|---|---|---|---|---|---|---|
| Mooney viscosity | (MU) | ASTM D1646 (2018) | 62.2 | 74.5 | 62.8 | 65.9 |
| Stress at Break | (MPa) | ASTM D412C (2016) | 16.8 | 16.5 | 16.4 | 15.9 |
| Elongation at Break | (%) | ASTM D412C (2016) | 501 | 479 | 475 | 467 |
| Hardness | (shore A) | ASTM D2240 (2015) | 60 | 60 | 59 | 60 |
| Tear resistance | (N/mm) | DELFT ISO34 (2015) | 33.4 | 35.2 | 32.5 | 33.3 |
| Abraded volume | (mm³/40 m) | ASTM D5963 (2019) | 125 | 123 | 136 | 139 |

From the data reported in Table 6, it is clear that the compounds comprising styrene-butadiene rubber comprising micronized recycled rubber powder obtained in accordance with the process of the present disclosure [Compound (A) and Compound (B)] maintain or even improve the physical-mechanical properties compared to the compounds comprising styrene-butadiene rubber and recycled rubber powder obtained by dry mixing [Compound (C) and Compound (D)]. In particular, it should be noted that Compound (A) and Compound (B) show an improvement in relation to tear resistance and abraded volume compared to Compound (C) and Compound (D), respectively.

Example 6

The physical-mechanical properties of compound (B) were compared with those of compound (E), comprising styrene-butadiene rubber comprising micronized recycled rubber powder SBR+20 phr ELT with a particle size ranging from 0.8 mm to 2.5 mm (Tritogran 1-P-0.8-2.5 mm-Tritogom), said rubber being obtained by operating as described in Example 1.

The compound (E) was obtained by operating under the operating conditions reported in Example 5 (i.e. same mixing, acceleration and vulcanization cycle) and the same components and amounts reported in Table 5 for compound (B) (i.e. 157.5 phr of e-SBR+micronized recycled rubber powder+same phr of said further components).

Table 7 shows the properties of the vulcanized compounds obtained and the relative measuring methods.

TABLE 7

| Definition | Unit of measurement | Method | Compounds (B) | (E) |
|---|---|---|---|---|
| Mooney viscosity | (MU) | ASTM D1646 (2018) | 74.5 | 65.4 |
| Stress at Break | (MPa) | ASTM D412C (2016) | 16.5 | 12.3 |
| Elongation at Break | (%) | ASTM D412C (2016) | 479 | 434 |
| Hardness | (shore A) | ASTM D2240 (2015) | 60 | 58 |
| Tear resistance | (N/mm) | DELFT ISO34 (2015) | 35.2 | 34.9 |
| Abraded volume | (mm³/40 m) | ASTM D5963 (2019) | 123 | 128 |

From the data reported in Table 7, it is clear that the compound comprising styrene-butadiene rubber comprising micronized recycled rubber powder obtained in accordance with the process of the present disclosure [Compound (B)] has improved physical-mechanical properties compared to the compound comprising styrene-butadiene rubber and recycled rubber powder having a larger particle size [Compound (E)].

The invention claimed is:

1. A process for the preparation of a styrene-butadiene rubber comprising micronized recycled rubber powder, said process comprising the following steps:
   (a) preparing a suspension comprising micronized recycled rubber powder, water and at least one surfactant;
   (b) mixing the suspension obtained in step (a) with at least one styrene-butadiene latex to obtain a styrene-butadiene latex comprising micronized recycled rubber powder; and
   (c) subjecting the latex obtained in step (b) to coagulation to obtain a coagulated styrene-butadiene rubber comprising micronized recycled rubber powder;
   wherein:
   in step (a) the particle size of said micronized recycled rubber powder is ranging from 0.05 mm to 0.8 mm;

in step (a) said at least one surfactant is present in an amount ranging from 0.5% by weight to 3% by weight, with respect to the total weight of said recycled rubber powder; and in step (a) said micronized recycled rubber powder has a concentration in water ranging from 1% by weight to 50% by weight, with respect to the total weight of said water.

2. The process for the preparation of a styrene-butadiene rubber comprising micronized recycled rubber powder according to claim 1, wherein in step (a) said at least a surfactant is selected from the group consisting of:

non-ionic surfactants; and/or anionic surfactants; sodium, potassium, lithium, or ammonium salts, of fatty acids, saturated or unsaturated, containing from 6 to 22 carbon atoms in the molecule; sodium, potassium, lithium, or ammonium salts, of modified resin acids which are obtained by dimerization, disproportionation, hydrogenation, modification of resin acid mixtures containing abietic acid, neoabietic acid, palustric acid, levopimaric acid, or mixtures thereof, or mixtures of said salts; and/or cationic surfactants; and/or amphoteric surfactants.

3. The process for the preparation of a styrene-butadiene rubber comprising micronized recycled rubber powder according to claim 1, wherein said step (a) is carried out at a temperature ranging from 20° C. to 90° C. for a variable time depending on the size of the mixer and sufficient to obtain a homogeneous suspension, for a time ranging from 5 minutes to 60 minutes.

4. The process for the preparation of a styrene-butadiene rubber comprising micronized recycled rubber powder according to claim 1, wherein in said step (b) said at least one styrene-butadiene latex has an amount of styrene-butadiene polymer ranging from 10% by weight to 50% by weight, with respect to the total weight of said latex and an amount of linked styrene ranging from 10% by weight to 60% by weight, with respect to the total weight of said latex.

5. The process for the preparation of a styrene-butadiene rubber comprising micronized recycled rubber powder according to claim 1, wherein in said step (b) the suspension obtained in step (a) is added in such an amount to have an amount of micronized recycled rubber powder ranging from 5% by weight to 95% by weight, with respect to the total weight of the styrene-butadiene rubber contained in the latex.

6. The process for the preparation of a styrene-butadiene rubber comprising micronized recycled rubber powder according to claim 1, wherein said step (b) is carried out at a temperature ranging from 20° C. to 90° C., for a variable time depending on the size of the mixer and sufficient to obtain a styrene-butadiene latex comprising micronized recycled rubber powder, wherein said powder is homogeneously distributed in the latex, for a period of time ranging from 1 minute to 45 minutes.

7. A process for the preparation of a styrene-butadiene rubber comprising micronized recycled rubber powder includes the following steps:

(a1) preparing a suspension comprising micronized recycled rubber powder, water and at least one surfactant; and (c1) mixing the suspension obtained in step (a) with at least one styrene-butadiene latex and subjecting the whole to coagulation to obtain a coagulated styrene-butadiene rubber comprising micronized recycled rubber powder;

wherein:

in step (a1) the particle size of said micronized recycled rubber powder is ranging from 0.05 mm to 0.8 mm;

in step (a1) said at least one surfactant is present in an amount ranging from 0.5% by weight to 3% by weight, with respect to total weight of said micronized recycled rubber powder; and in step (a1) said micronized recycled rubber powder has a concentration in water ranging from 1% by weight to 50% by weight, with respect to the total weight of said water.

8. The process for the preparation of a styrene-butadiene rubber comprising micronized recycled rubber powder, the process includes the following steps:

(a1) preparing a suspension comprising micronized recycled rubber powder, water and at least one surfactant; and (c1) mixing the suspension obtained in step (a) with at least one styrene-butadiene latex and subjecting the whole to coagulation to obtain a coagulated styrene-butadiene rubber comprising micronized recycled rubber powder;

wherein:

in step (a1) the particle size of said micronized recycled rubber powder is ranging from 0.05 mm to 0.8 mm;

in step (a1) said at least one surfactant is present in an amount ranging from 0.5% by weight to 3% by weight, with respect to total weight of said micronized recycled rubber powder;

in step (a1) said micronized recycled rubber powder has a concentration in water ranging from 1% by weight to 50% by weight, with respect to the total weight of said water, wherein said step (a1) is carried out according to claim 2.

9. The process for the preparation of a styrene-butadiene rubber comprising micronized recycled rubber powder according to claim 1, wherein said step (c) and step (c1) are carried out in the presence of at least one coagulation agent selected from alkylamine-epichloridine copolymers.

10. The process for the preparation of a styrene-butadiene rubber comprising micronized recycled rubber powder according to claim 1, wherein said step (c) and step (c1) are carried out at a temperature ranging from 40° C. to 90° C., for a variable time depending on the size of the coagulation mixer, the amount of suspension obtained in step (a) or step (a1) and of the used styrene-butadiene latex, the temperature and the pH, the used stirring system, for a time ranging from 5 minutes to 120 minutes.

11. The process for the preparation of a styrene-butadiene rubber comprising micronized recycled rubber powder according to claim 1, wherein said step (c) and step (c1) are carried out at a pH lower than or equal to 5.

12. The process for the preparation of a styrene-butadiene rubber comprising micronized recycled rubber powder according to claim 1, wherein at least one inorganic acid is added in said step (c) and step (c1), said at least one organic acid being added in such an amount to maintain the pH lower than or equal to 5, for the entire duration of said step (c) and step (c1).

13. The process for the preparation of a styrene-butadiene rubber comprising micronized recycled rubber powder according to claim 1, wherein said process is carried out in batch or continuously.

* * * * *